US010355826B2

(12) United States Patent
Xiao et al.

(10) Patent No.: US 10,355,826 B2
(45) Date of Patent: Jul. 16, 2019

(54) COMMUNICATION METHODS PERFORMED BY SECONDARY BASE STATION AND MASTER BASE STATION AND ASSOCIATED BASE STATIONS

(71) Applicant: SHARP KABUSHIKI KAISHA, Sakai, Osaka (JP)

(72) Inventors: Fangying Xiao, Shanghai (CN); Renmao Liu, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 42 days.

(21) Appl. No.: 15/116,761

(22) PCT Filed: Jan. 15, 2015

(86) PCT No.: PCT/CN2015/070788
§ 371 (c)(1),
(2) Date: Aug. 4, 2016

(87) PCT Pub. No.: WO2015/117537
PCT Pub. Date: Aug. 13, 2015

(65) Prior Publication Data
US 2016/0352469 A1 Dec. 1, 2016

(30) Foreign Application Priority Data
Feb. 8, 2014 (CN) .......................... 2014 1 0045528

(51) Int. Cl.
*H04L 1/16* (2006.01)
*H04L 1/18* (2006.01)
(Continued)

(52) U.S. Cl.
CPC .......... *H04L 1/1621* (2013.01); *H04L 1/1614* (2013.01); *H04L 1/1642* (2013.01);
(Continued)

(58) Field of Classification Search
CPC ... H04L 1/1621; H04L 1/1642; H04L 1/1867; H04L 1/1614
See application file for complete search history.

(56) References Cited

U.S. PATENT DOCUMENTS

2004/0184437 A1* 9/2004 Lee ........................ H04L 1/1685
370/349
2013/0088960 A1* 4/2013 Bi .......................... H04L 1/1841
370/235
(Continued)

FOREIGN PATENT DOCUMENTS

CN   10154769 A    9/2009
CN  102833802 A   12/2012

OTHER PUBLICATIONS

BlackBerry UK Limited, "Further Discussion on U-Plane Protocol Architecture Designs", R2-132442, 3GPP TSG RAN WG2 Meeting #83, Barcelona Spain, Aug. 19-23, 2013, pp. 1-6, XP055397904.
(Continued)

*Primary Examiner* — Gary Mui
(74) *Attorney, Agent, or Firm* — Birch, Stewart, Kolasch & Birch, LLP

(57) ABSTRACT

The present disclosure provides a method in a secondary Base Station (BS) for reporting a downlink data transmission state to a master BS. The method comprises: transmitting, by the secondary BS, one or more Packet Data Convergence Protocol (PDCP) Protocol Data Units (PDUs) from the master BS to a User Equipment (UE); and transmitting, by the secondary BS, to the master BS a downlink data transmission state message including a sequence number of at least one PDCP PDU that has been transmitted successfully. The present disclosure also provides a method in a master BS for discarding PDCP PDUs as early as possible. The method comprises: receiving, by the master BS, from a secondary BS a downlink data transmission state message; and discarding, by the master BS, one or more PDCP PDUs stored in the master BS based on the downlink data transmission state message. The associated master BS and secondary BS are also provided.

20 Claims, 6 Drawing Sheets

(51) Int. Cl.
 *H04W 80/02* (2009.01)
 *H04W 84/04* (2009.01)

(52) U.S. Cl.
 CPC .......... *H04L 1/1867* (2013.01); *H04L 1/1809* (2013.01); *H04W 80/02* (2013.01); *H04W 84/042* (2013.01)

(56) References Cited

U.S. PATENT DOCUMENTS

| | | | |
|---|---|---|---|
| 2015/0043435 A1* | 2/2015 | Blankenship | H04L 69/322 370/329 |
| 2015/0208283 A1 | 7/2015 | Yang et al. | |
| 2016/0113058 A1* | 4/2016 | Jung | H04B 7/2612 370/328 |
| 2016/0119826 A1* | 4/2016 | Huh | H04W 76/025 370/332 |
| 2016/0164793 A1* | 6/2016 | Basu Mallick | H04W 28/06 370/235 |
| 2016/0219565 A1* | 7/2016 | Uchino | H04W 76/025 |
| 2016/0249232 A1* | 8/2016 | Uchino | H04W 80/02 |

OTHER PUBLICATIONS

MediaTek Inc., "UP architecture 3: Alternatives 3C & 3D", 3GPP Draft R2-133557 Up Arch 3, 3rd Generation Partnership Project (3GPP), 3GPP TSG-RAN2 #83bis Meeting, Ljubljana, Slovenia, Oct. 7-11, 2013.

Intel Corporation, "PDCP reordering for option 3C in dual connectivity", 3GPP TSG-RAN WG2#85 R2-140269, Jan. 31, 2014, pp. 1-3.

Advanced Lte, "3rd Generation Partnership Project, Technical Specification Group Radio Access Network; Study on Small Cell enhancements for E-UTRA and E-UTRAN; Higher layer aspects", (Release 12), 3GPP TR 36.842 V12.0.0 (Dec. 2013).

Overview of 3GPP Release 11 V0.2.0 (Sep. 2014).
Overview of 3GPP Release 12 V0.2.0 (Sep. 2015).

* cited by examiner

COMMUNICATION METHODS PERFORMED BY SECONDARY BASE STATION AND MASTER BASE STATION AND ASSOCIATED BASE STATIONS

TECHNICAL FIELD

The present disclosure relates to mobile communications, and more particularly, to a method in a secondary Base Station (BS) for reporting a downlink data transmission state to a master BS, a method in a master BS for discarding a Packet Data Convergence Protocol (PDCP) Protocol Data Unit (PDU) as early as possible, and associated secondary BS and master BS.

BACKGROUND

The user plane protocol stack at Layer 2 in the $3^{rd}$ Generation Partnership Project (3GPP) Long Term Evolution (LTE) system consists of three sub-layers. They are, from high to low: Packet Data Convergence Protocol (PDCP) layer, Radio Link Control (RLC) layer and Media Access Control (MAC) layer. At the transmitting side, traffic is provided to a particular layer by receiving Service Data Units (SDUs) from a higher layer and Protocol Data Units (PDUs) are outputted to a lower layer. For example, the RLC layer receives packets from the PDCP layer. These packets are PDCP PDUs for the PDCP layer, but also RLC SDUs for the RLC layer. An inverse process occurs at the receiving side. That is, each layer sends SDUs to a higher layer, which receives them as PDUs. The PDCP SDUs are subjected to IP header compression, encryption and addition of PDCP headers and then mapped to PDCP PDUs. The RLC SDUs are segmented and concatenated according to a size specified at the MAC layer, added with RLC headers and then mapped to RLC PDUs. Each PDCP SDU is identified by a PDCP sequence number (SN). Each PDCP SDU has the same SN as its corresponding PDCP PDU and RLC SDU. Each RLC PDU is identified by an RLC SN.

In 3GPP LTE Release 11, each radio bearer has a PDCP entity and an RLC entity. Each Base Station (BS), or NodeB or evolved NodeB (eNB), and each User Equipment (UE) has a MAC entity. After successfully transmitting RLC PDUs corresponding to respective segments of an RLC SDU, the RLC entity in the BS or UE transmits to the PDCP entity in the same BS or UE an indication of successful transmission of the PDCP PDUs. Upon receiving the indication of successful transmission of the PDCP PDUs, the PDCP entity discards those PDCP PDUs and releases a retransmission buffer in the PDCP entity so as to receive more PDCP SDUs from the higher layer. Here, the UE can be a user terminal, a user node, a mobile terminal or a tablet computer.

The 3GPP LTE Release 12, which is currently being developed, involves standardization for dual connectivity enabled UE, master BS (master eNB) and secondary BS (secondary eNB). A master BS maintains Radio Resource Management (RRM) and measurement configurations for a UE, and requests from a secondary BS (the coverage of which is also referred to as "serving cell" of the UE) additional resources for the UE based on a received measurement report, a traffic condition or a bearer type. Upon receiving the request from the master BS, the secondary BS either configures a serving cell for the UE, or rejects the request due to lack of sufficient resources.

Based on different schemes for bearer split and different user plane protocol stacks, in 3GPP TSG-RAN2 Meeting 83bis, two user plane architectures, 1A and 3C, have been determined as standardization options for the dual connectivity deployment. As shown in FIG. 1, the option 3C has the following features: (1) the master BS communicates with a Serving Gateway (S-GW) via an S1-U interface; (2) the bearer split occurs in the master BS; and (3) for a split bearer, its corresponding RLC entity exists in both the master BS and the secondary BS. In the option 3C, the RLC entity at the secondary BS interacts with a higher layer (i.e., a PDCP entity at the master BS) via an X2 interface.

In a non-dual-connectivity deployment, since the PDCP entity and the RLC entity are located in one single BS, once an RLC SDU has been successfully transmitted, the RLC SDU and its corresponding PDCP SDU and PDCP PDU can be discarded. This process can be implemented inside the BS and no further standardization is needed. However, in the option 3C for dual connectivity deployment, the PDCP entity and one of the RLC entities corresponding to a split bearer is located in the master BS while the other one of the RLC entities is located in the secondary BS. The existing solutions for the non-dual-connectivity deployment cannot solve the problem of discarding a successfully transmitted PDCP PDU in the secondary BS and its corresponding PDCP PDU and PDCP SDU in the master BS. Thus, the PDCP SDU and the PDCP PDU that have been transmitted successfully will be stored in the retransmission buffer for a long time, until a discard timer associated with the PDCP SDU expires, resulting in a waste of storage space. Further, as the storage of the successfully transmitted PDCP SDUs and the PDCP PDUs in the retransmission buffer occupies a large storage space for a long time, when the higher layer transmits PDCP SDUs at a high rate while the PDCP retransmission buffer has been filled with PDCP SDUs that have been transmitted successfully but have not expired, the newly arrived PDCP SDUs will be dropped, thereby degrading the reliability of the radio link.

SUMMARY

In order to solve the above problems, the present disclosure is intended to provide a mechanism that enables a master BS to discard a PDCP PDU that has been successfully transmitted by a secondary BS.

In order to achieve the above object, according to a first aspect of the present disclosure, a communication method performed by a secondary Base Station (BS) is provided. The method comprises steps of: transmitting, by the secondary BS, one or more Packet Data Convergence Protocol (PDCP) Protocol Data Units (PDUs) from a master BS to a User Equipment (UE); and transmitting, by the secondary BS, to the master BS a downlink data transmission state message including a sequence number of at least one PDCP PDU that has been transmitted successfully.

Optionally, the method according to the first aspect further comprises: determining, by the secondary BS, whether to transmit the downlink data transmission state message to the master BS or not based on at least one of: a number of PDCP PDUs that have been transmitted successfully having reached a predetermined value; a predetermined timer having expired; and a difference between a maximum and a minimum sequence numbers among PDCP PDUs that have been transmitted successfully being larger than or equal to a predetermined bitmap length.

According to a second aspect of the present disclosure, a secondary Base Station (BS) is provided. The secondary BS comprises: a data transmitting unit configured to transmit one or more Packet Data Convergence Protocol (PDCP)

Protocol Data Units (PDUs) from a master BS to a User Equipment (UE); and a downlink data transmission state message transmitting unit configured to transmit to the master BS a downlink data transmission state message including a sequence number of at least one PDCP PDU that has been transmitted successfully.

Optionally, the secondary BS according to the second aspect further comprises: a determining unit configured to determine whether to transmit the downlink data transmission state message to the master BS or not based on at least one of: a number of PDCP PDUs that have been transmitted successfully having reached a predetermined value; a predetermined timer having expired; and a difference between a maximum and a minimum sequence numbers among PDCP PDUs that have been transmitted successfully being larger than or equal to a predetermined bitmap length.

According to a third aspect of the present disclosure, a communication method performed by a master Base Station (BS) is provided. The communication method comprises steps of: receiving, by the master BS, from a secondary BS a downlink data transmission state message; and discarding, by the master BS, one or more PDCP PDUs stored in the master BS based on the downlink data transmission state message.

According to a fourth aspect of the present disclosure, a master Base Station (BS) is provided. The master BS comprises: a downlink data transmission state message receiving unit configured to receive from a secondary BS a downlink data transmission state message including a sequence number of at least one Packet Data Convergence Protocol (PDCP) Protocol Data Unit (PDU) that has been transmitted successfully; and a PDCP PDU discarding unit configured to discard one or more PDCP PDUs stored in the master BS based on the downlink data transmission state message.

With the solutions according to the present disclosure, after PDCP PDUs have been successfully transmitted by the secondary BS, the master BS can discard the corresponding PDCP PDUs as early as possible, such that the storage space at the master BS can be saved and more SDUs can be received from the higher layer.

BRIEF DESCRIPTION OF THE DRAWINGS

The above and other objects, features and advantages will be more apparent from the following description of embodiments with reference to the figures, in which.

DETAILED DESCRIPTION

The principles and implementations of the present disclosure will become more apparent from the following description of the embodiments taken in conjunction with the drawings. It should be noted that the following embodiments are illustrative only, rather than limiting the scope of the present disclosure. In the following description, details of well-known techniques which are not directly relevant to the present invention will be omitted so as not to obscure the concept of the invention.

In the following, a number of embodiments of the present invention will be detailed in an exemplary application environment of LTE Release 12 mobile communication system and its subsequent evolutions. Herein, it is to be noted that the present invention is not limited to the application exemplified in the embodiments. Rather, it is applicable to other communication systems, such as the future 5G cellular communication system. Moreover, while the exemplary implementations of the solutions of the present disclosure are described here with reference to a situation where a master BS and one secondary BS cooperate to provide a UE with communication services, it can be appreciated by those skilled in the art that the solutions of the present disclosure also applies to a situation where a master BS and more than one secondary BS cooperate to provide a UE with communication services.

Figure 1:
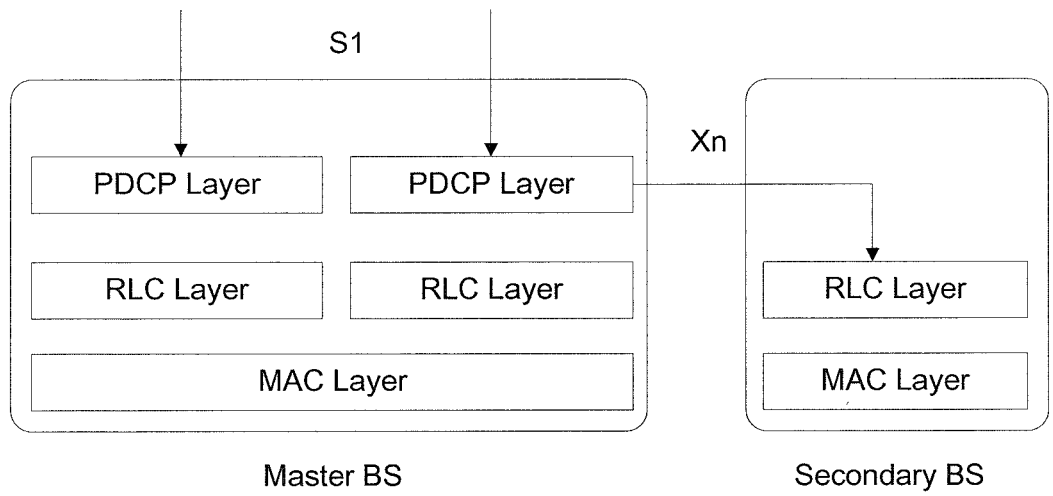
FIG. 1 is a schematic diagram showing an option 3C for dual connectivity deployment as specified in 3GPP TR 36.842.
Figure 2:
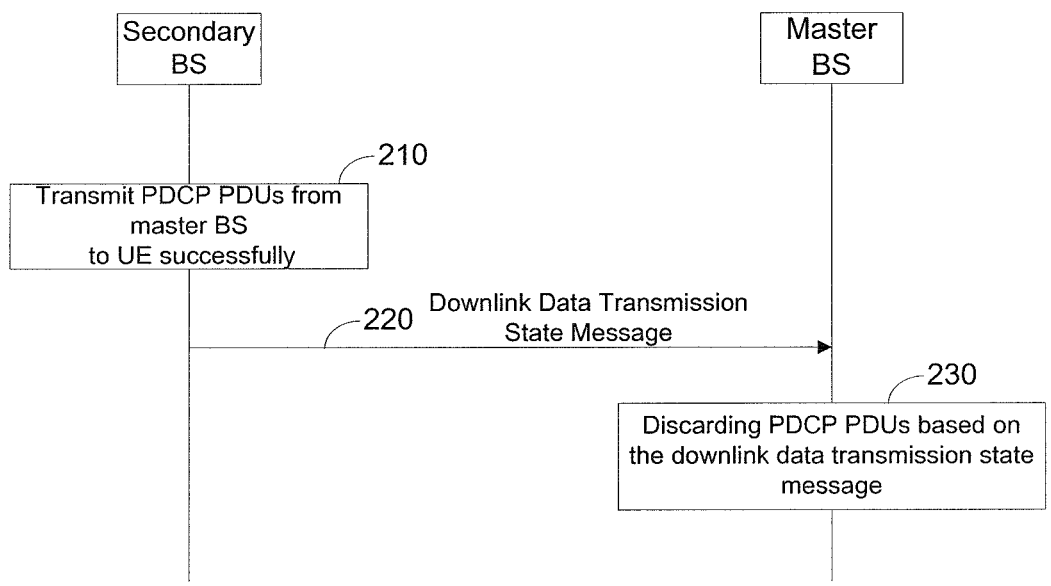
FIG. 2 is a sequence diagram showing a communication process for enabling a master BS to discard PDCP PDUs that have been successfully transmitted by a secondary BS according to the present disclosure.

Reference is made to FIG. 2 first, which shows a communication process for enabling a master BS to discard PDCP PDUs corresponding to one or more PDCP PDUs that have been successfully transmitted by a secondary BS according to the present disclosure. As shown, the process starts with step 210 where a secondary BS transmits PDCP PDUs from a master BS to a UE. Next, at step 220, the secondary BS transmits to the master BS a downlink data transmission state message including a sequence number of at least one PDCP PDU that has been transmitted successfully, via an X2 interface. Finally at step 230, the master BS discards one or more PDCP PDUs stored in the master BS based on the downlink data transmission state message. In particular, the master BS determines whether any PDCP PDU indicated in the downlink data transmission state message and/or any corresponding PDCP SDU is stored locally. If any PDCP PDU indicated in the downlink data transmission state message and/or any corresponding PDCP SDU is stored locally, the PDCP PDU and/or the corresponding PDCP SDU is discarded.

In an implementation, the downlink data transmission state message may include a sequence number of one PDCP PDU only. In this case, each time the secondary BS transmits a PDCP PDU from the master BS successfully, it transmits to the master BS an indication message including the sequence number of the PDCP PDU.

In a case where the downlink data transmission state message can carry more information (e.g., sequence numbers of more than one PDCP PDU and/or a bitmap which will be described in detail later with reference to FIG. 7), the secondary BS can determine whether a condition for transmitting a downlink data transmission state message to the master BS is satisfied, so as to avoid transmitting downlink data transmission state messages to the master BS too frequently.

In an embodiment of the present disclosure, the condition for the secondary BS to transmit a downlink data transmission state message to the master BS may include at least one of: a number of PDCP PDUs that have been transmitted successfully having reached a predetermined value; a predetermined timer having expired; and a difference between a maximum and a minimum sequence numbers among PDCP PDUs that have been transmitted successfully being larger than or equal to a predetermined bitmap length. Here, the predetermined value, a timing period of the timer or a bitmap length may depend on various factors such as a transmission rate over a radio link, a processing capability of the master BS and a timing period of a PDCP SDU discarding timer in the master BS, and can be configured in an inter-node Radio Resource Control (RRC) message via an X2 interface. The indication message associated with successfully transmitted PDCP PDU(s) may include sequence number(s), or a bitmap, of one or more PDCP PDUs that have been transmitted successfully. The bitmap may have a fixed or variable length.

Figure 3:
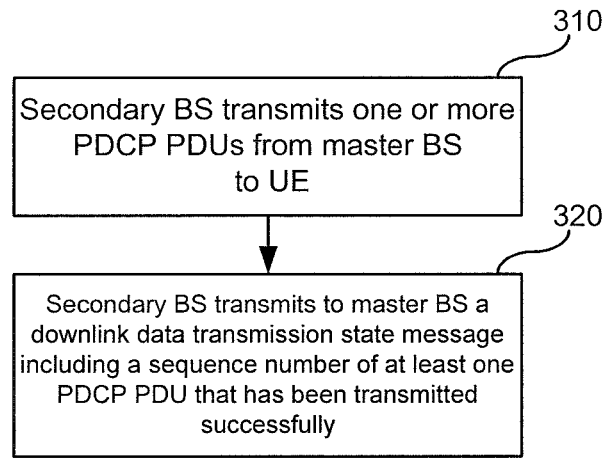
FIG. 3 is a flowchart illustrating a method in a secondary BS for reporting a downlink data transmission state to a master BS according to the present disclosure.
Figure 4:
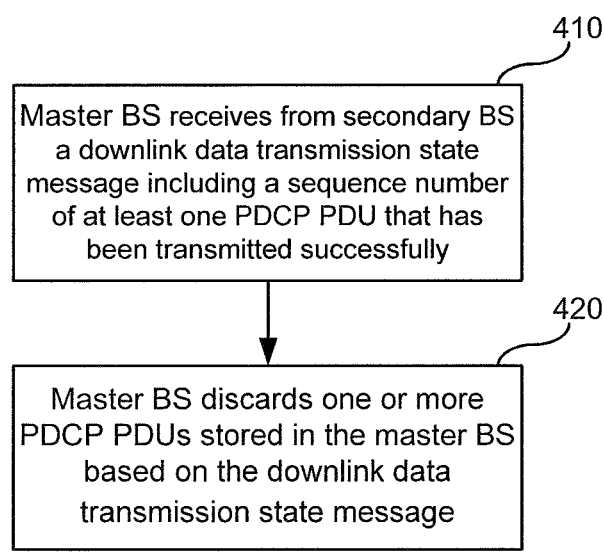
FIG. 4 is a flowchart illustrating a method in a master BS for discarding PDCP PDUs as early as possible according to the present disclosure.

FIG. 3 and FIG. 4 are flowcharts illustrating methods performed by the secondary BS and the master BS, respectively, in the communication process shown in FIG. 2. As shown in FIG. 3, the method performed by the secondary BS for reporting a downlink data transmission state to the master BS starts with step 310 where the secondary BS transmits one or more PDCP PDU from the master BS to a UE. At step 320, the secondary BS transmits to the master BS a downlink data transmission state message including a sequence number of at least one PDCP PDU that has been transmitted successfully.

As shown in FIG. 4, in the method performed by the master BS for discarding PDCP PDUs as early as possible, at step 410, the master BS, receives from the secondary BS a downlink data transmission state message including a sequence number of at least one Packet Data Convergence Protocol (PDCP) Protocol Data Unit (PDU) that has been transmitted successfully. Next, at step 420, the master BS discards one or more PDCP PDUs stored in the master BS based on the downlink data transmission state message.

Next, the methods in a secondary BS for reporting a downlink data transmission state to a master BS according to three exemplary embodiments will be described in detail with reference to FIGS. 5-8. In these methods, the secondary BS determines whether a condition for reporting a downlink data transmission state to the master BS is satisfied. Different determination conditions are used in different embodiments.

Figure 5:
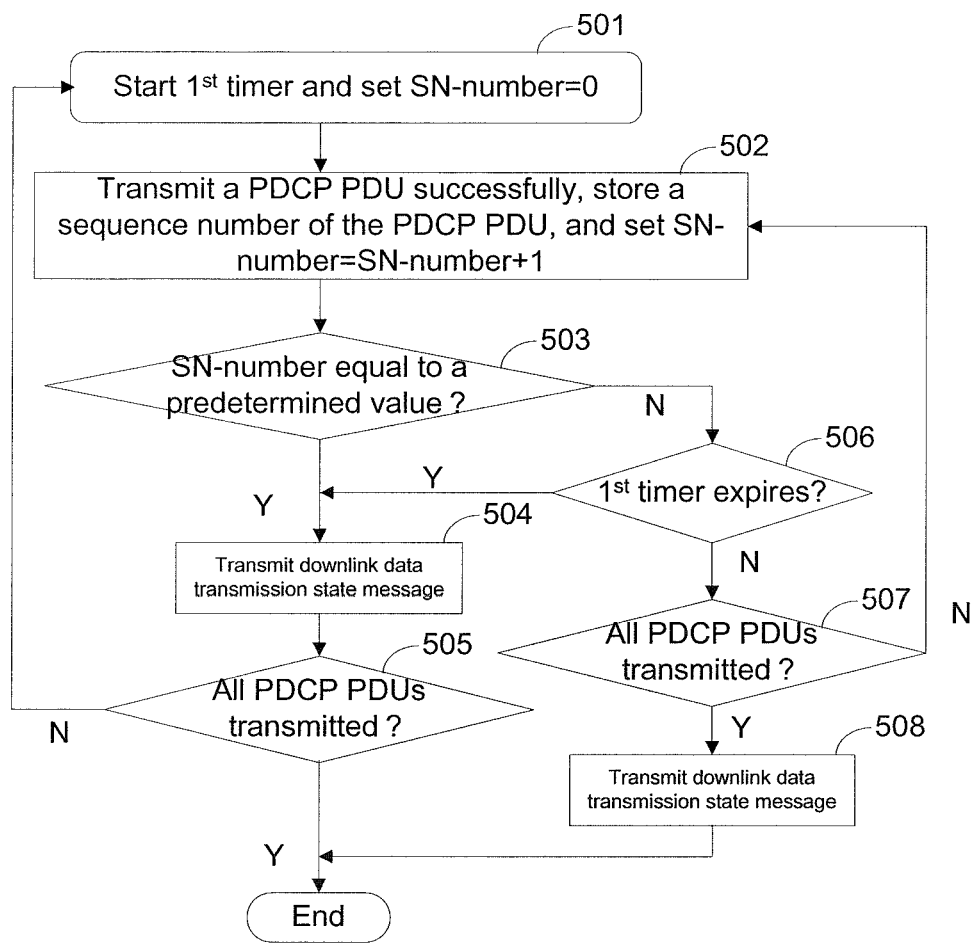
FIG. 5 is a flowchart illustrating a method in a secondary BS for reporting a downlink data transmission state to a master BS according to an exemplary embodiment of the present disclosure.

FIG. 5 is a flowchart illustrating an embodiment in which the secondary BS uses the number of PDCP PDUs that have been transmitted successfully as a determination condition and the downlink data transmission state message includes sequence numbers of a plurality of PDCP PDUs that have been transmitted successfully.

As shown, at step 501, the secondary BS sets a value of SN-number to 0 and starts a first timer. Here, SN-number denotes the number of PDCP PDUs from the master BS that have been transmitted successfully. The value of the first timer can be configured to the RLC entity in the secondary BS via an inter-node RRC message and may depend on various factors such as a transmission rate over a radio link, a processing capability of the master BS and a timing period of a PDCP SDU discarding timer in the master BS.

At step 502, the secondary BS transmits a PDCP PDU from the master BS successfully, stores the sequence number of the successfully transmitted PDCP PDU locally and increments SN-number by 1 (i.e., SN-number=SN-number+1).

At step 503, the secondary BS determines whether the value of SN-number equals to a predetermined number of PDCP PDUs to be transmitted successfully. If so, the method proceeds with step 504; otherwise the method proceeds with step 506.

At step 504, the secondary BS transmits a downlink data transmission state message to the master BS via an X2 interface. The downlink data transmission state message includes the sequence number of each PDCP PDU that has been transmitted successfully, and optionally the number of PDCP PDUs that have been transmitted successfully.

At step 505, the secondary BS determines whether all PDCP PDUs from the master BS have been transmitted. If not, the method proceeds with step 501 to continue transmitting PDCP PDUs. If all the PDCP PDUs have been transmitted, the method ends.

At step 506, the secondary BS determines whether the first timer has expired. If so, the method proceeds with step 504; otherwise the method proceeds with step 507.

At step 507, the secondary BS determines whether all PDCP PDUs from the master BS have been transmitted. If not, the method proceeds with step 502 to continue transmitting PDCP PDUs. If all the PDCP PDUs have been transmitted, the method proceeds with step 508 to transmit a downlink data transmission state message to the master BS.

With the method shown in FIG. 5, each time when the predetermined number of PDCP PDUs have been transmitted, the secondary BS indicates to the master BS to discard the PDCP PDUs.

Figure 6:
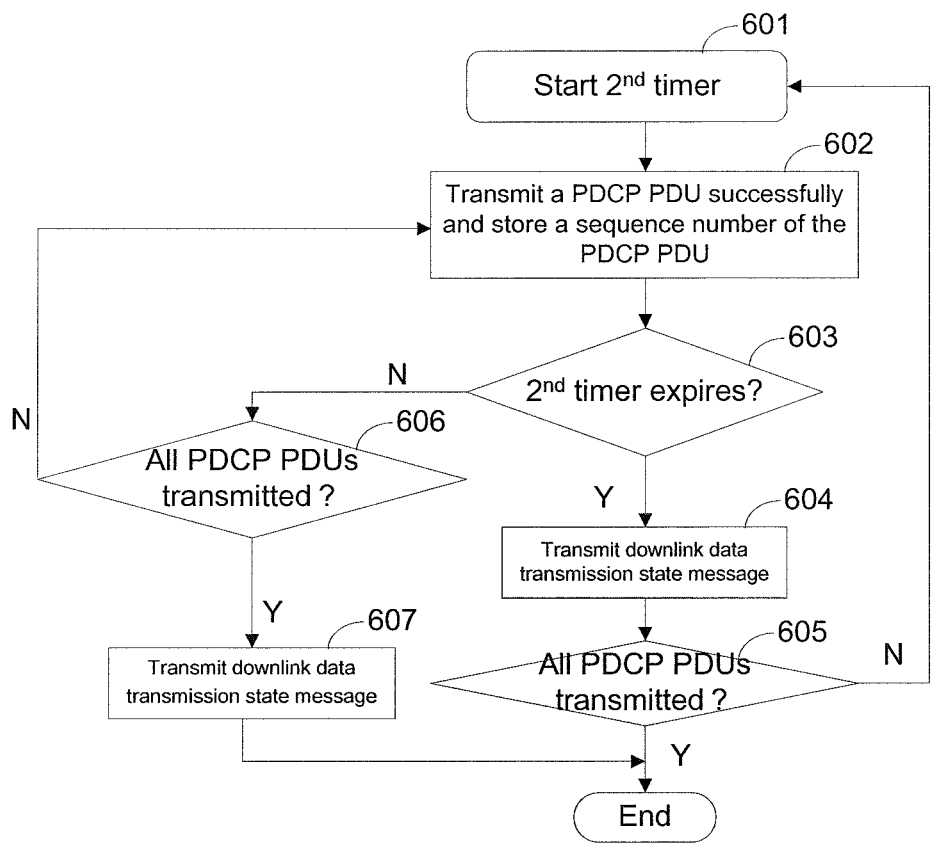
FIG. 6 is a flowchart illustrating a method in a secondary BS for reporting a downlink data transmission state to a master BS according to another exemplary embodiment of the present disclosure.

FIG. 6 is a flowchart illustrating an embodiment in which the secondary BS uses a predetermined timing period as a determination condition and the downlink data transmission state message includes sequence numbers of a plurality of PDCP PDUs that have been transmitted successfully.

As shown, in step 601, the secondary BS starts a second timer. The value of the second timer can be configured to the RLC entity in the secondary BS via an inter-node RRC message and may depend on various factors such as a transmission rate over a radio link, a processing capability of the master BS and a timing period of a PDCP SDU discarding timer in the master BS.

At step 602, the secondary BS transmits a PDCP PDU from the master BS successfully, and stores the sequence number of the successfully transmitted PDCP PDU locally.

At step 603, the secondary BS determines whether the second timer has expired. If so, the method proceeds with step 604; otherwise the method proceeds with step 606.

At step 604, the secondary BS transmits a downlink data transmission state message to the master BS via an X2 interface. The downlink data transmission state message includes the sequence number of each PDCP PDU that has been transmitted successfully, and optionally the number of PDCP PDUs that have been transmitted successfully.

At step 605, the secondary BS determines whether all PDCP PDUs from the master BS have been transmitted. If not, the method proceeds with step 601 to continue transmitting PDCP PDUs. If all the PDCP PDUs have been transmitted, the method ends.

At step 606, the secondary BS determines whether all PDCP PDUs from the master BS have been transmitted. If not, the method proceeds with step 602 to continue transmitting PDCP PDUs. If all the PDCP PDUs have been transmitted, the method proceeds with step 607 to transmit a downlink data transmission state message to the master BS.

With the method shown in FIG. 6, each time when the second timer expires, the secondary BS indicates to the master BS to discard PDCP PDUs.

Figure 7:
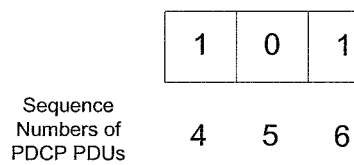
FIG. 7 is a schematic diagram showing a bitmap included in a downlink data transmission state message.

FIG. 7 shows a structure of a bitmap according to an exemplary embodiment. The bitmap shown in FIG. 7 may have a fixed or variable length. Each indication bit in the bitmap having a value of 1 indicates that its corresponding PDCP PDU has been transmitted successfully. Each indication bit in the bitmap having a value of 0 indicates that its corresponding PDCP PDU has not been transmitted successfully. Each bit corresponding to a PDCP PDU transmitted by the RLC entity in the master BS has a value of 0. For example, there are 10 PDCP SDUs to be transmitted in the master BS, among which PDCP SDUs having sequence numbers of 1, 2, 5, 7 and 9 are to be transmitted to the RLC entity in the master BS and PDCP SDUs having sequence number of 0, 3, 4, 6 and 8 are to be transmitted to the RLC entity in the secondary BS. Assuming that the minimum sequence number among the PDCP PDUs that have been transmitted successfully is 3, the bitmap in the downlink data transmission state message is shown in FIG. 7. In particular, in the bitmap shown in FIG. 7, the sequence numbers of the PDCP PDU that have been transmitted successfully are 4 and 6, respectively. Since the PDCP PDU having a sequence number of 5 is transmitted by the RLC entity in the master BS, its corresponding indication bit in the bitmap has a value of 0. The sequence number of the PDCP PDU having a sequence number of 3 is indicated in the field of the minimum sequence number among the PDCP SDUs that have been transmitted successfully in the message header of the downlink data transmission state message and is thus omitted in the bitmap. The values of each indication bit in the bitmap can be any two values distinguishable from each other, including but not limited to {0, 1} or {True, False}.

In an implementation, the embodiment in which the downlink data transmission state message includes a bitmap having a variable length and the embodiment of FIG. 6 in which the downlink data transmission state message includes sequence numbers of a plurality of PDCP PDUs that have been transmitted successfully have the same flowchart (i.e., a predetermined timing period is used as the condition for determining whether to transmit the indication message or not), except that the downlink data transmission state message transmitted at step 604 includes a minimum sequence number among the PDCP PDUs that have been transmitted successfully, and a bitmap indicating whether each PDCP PDU subsequent to the PDCP PDU having the minimum sequence number has been successfully transmitted by the secondary BS. The bitmap is generated based on the sequence numbers of the PDCP PDUs that have been transmitted successfully as stored in the step 602. In particular, in the bitmap, each indication bit corresponding to a PDCP PDU that has been transmitted successfully as stored in the secondary BS locally is 1 and other indication bits are 0. Optionally, the downlink data transmission state message includes a bitmap length.

Figure 8:
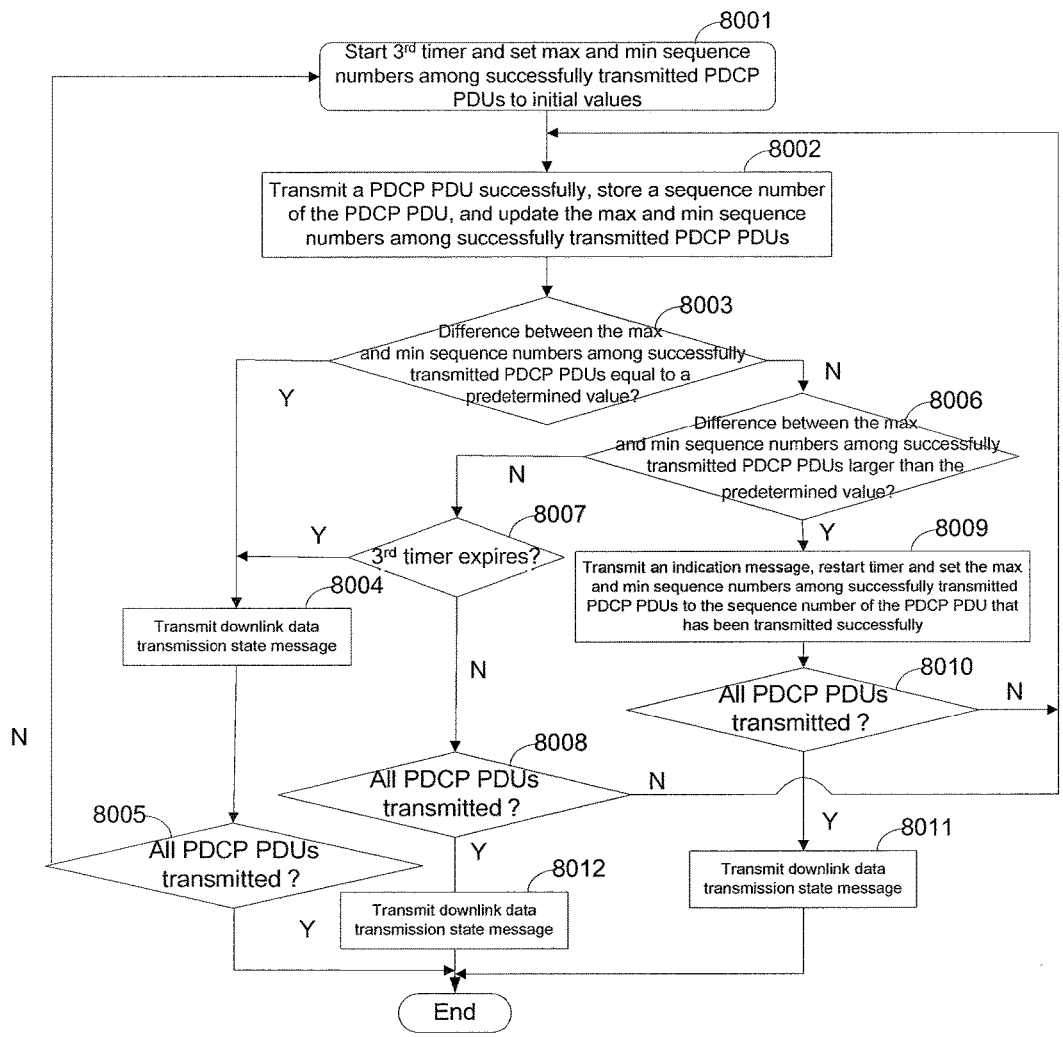
FIG. 8 is a flowchart illustrating a method in a secondary BS for reporting a downlink data transmission state to a master BS according to yet another exemplary embodiment of the present disclosure.

FIG. 8 shows a flowchart illustrating an exemplary embodiment in which the downlink data transmission state message includes a bitmap having a fixed length.

As shown, at step 8001, the secondary BS starts a third timer and sets a maximum sequence number and a minimum sequence number among the PDCP PDUs that have been transmitted successfully to their respective initial values. The value of the third timer can be configured to the RLC entity in the secondary BS via an inter-node RRC message and may depend on various factors such as a transmission rate over a radio link, a processing capability of the master BS and a timing period of a PDCP SDU discarding timer in the master BS. The initial values are special values different from any sequence number of any PDCP PDU to be transmitted, e.g., −1, indefinitely great, or indefinitely small.

At step 8002, the secondary BS transmits a PDCP PDU from the master BS successfully, stores the sequence number of the successfully transmitted PDCP PDU locally, and updates the values of the minimum and maximum sequence numbers among the PDCP PDUs that have been transmitted successfully.

In particular, if the minimum sequence number among the PDCP PDUs that have been transmitted successfully is the initial value, then it is set to the sequence number of the successfully transmitted PDCP PDU as stored locally. If the minimum sequence number among the PDCP PDUs that have been transmitted successfully is larger than the sequence number of the successfully transmitted PDCP PDU as stored locally, it is updated with the sequence number of the successfully transmitted PDCP PDU as stored locally. If the maximum sequence number among the PDCP PDUs that have been transmitted successfully is the initial value or is smaller than the sequence number of the successfully transmitted PDCP PDU as stored locally, it is updated with the sequence number of the successfully transmitted PDCP PDU as stored locally.

At step 8003, the secondary BS determines whether a difference between the maximum and the minimum sequence numbers among PDCP PDUs that have been transmitted successfully is equal to a predetermined bitmap length. If the difference is equal to the predetermined bitmap length, the method proceeds with step 8004; otherwise the method proceeds with step 8006.

At step 8004, the secondary BS transmits a downlink data transmission state message to the master BS via an X2 interface. The downlink data transmission state message includes a minimum sequence number among the PDCP PDUs that have been transmitted successfully, and a bitmap indicating whether each PDCP PDU subsequent to the PDCP PDU having the minimum sequence number has been successfully transmitted by the secondary BS. The bitmap is generated based on the sequence numbers of the PDCP PDUs that have been transmitted successfully as stored in the step 602. In particular, in the bitmap, each indication bit corresponding to a PDCP PDU that has been transmitted successfully as stored in the secondary BS locally is 1 and other indication bits are 0.

At step 8005, the secondary BS determines whether all PDCP PDUs from the master BS have been transmitted. If not, the method proceeds with step 8001 to continue transmitting PDCP PDUs. If all the PDCP PDUs have been transmitted, the method ends.

At step 8006, the secondary BS determines whether the difference between the maximum and the minimum sequence numbers among PDCP PDUs that have been transmitted successfully is larger than the predetermined bitmap length. If the difference is larger than the predetermined bitmap length, the method proceeds with step 8009; otherwise the method proceeds with step 8007.

At step 8007, the secondary BS determines whether the third timer has expired. If so, the method proceeds with step 8004; otherwise the method proceeds with step 8008.

At step 8008, the secondary BS determines whether all PDCP PDUs from the master BS have been transmitted. If not, the method proceeds with step 8002 to continue transmitting PDCP PDUs. If all the PDCP PDUs have been transmitted, the method ends.

At step 8009, the secondary BS transmits a downlink data transmission state message to the master BS via an X2 interface. The downlink data transmission state message includes a minimum sequence number among the PDCP PDUs that have been transmitted successfully, and a bitmap indicating whether each PDCP PDU subsequent to the PDCP PDU having the minimum sequence number has been successfully transmitted by the secondary BS. The bitmap is generated based on the sequence numbers of the PDCP PDUs that have been transmitted successfully as stored in the step 602. In particular, in the bitmap, each indication bit corresponding to a PDCP PDU that has been transmitted successfully as stored in the secondary BS locally is 1 and other indication bits are 0. In the step 8009, the secondary BS also restarts the timer, discards the successfully transmitted PDCP PDUs as stored locally other than the last PDCP PDU that has been transmitted successfully, and sets the maximum and the minimum sequence numbers among PDCP PDUs that have been transmitted successfully to the sequence number of the last PDCP PDU that has been transmitted successfully.

At step 8010, the secondary BS determines whether all PDCP PDUs from the master BS have been transmitted. If not, the method proceeds with step 8002 to continue transmitting PDCP PDUs. If all the PDCP PDUs have been transmitted, the method proceeds with step 8011.

At step 8011, the secondary BS transmits a downlink data transmission state message to the master BS via an X2 interface. The downlink data transmission state message includes the minimum sequence number among the PDCP PDUs that have been transmitted successfully, and optionally a bitmap in which all indication bits are 0.

In an embodiment of the present disclosure, the bitmap length can be configured to the RLC entity in the secondary BS in an inter-node RRC message via an X2 interface. The RRC message can be carried in a request message transmitted by the master BS to the secondary BS for requesting additional resources for the UE, or transmitted as a standalone message.

With the method shown in FIG. 8, each time when the difference between the maximum and the minimum sequence numbers among PDCP PDUs that have been transmitted successfully has reached a predetermined bitmap length, the secondary BS indicates to the master BS to discard the PDCP PDUs.

Figure 9:
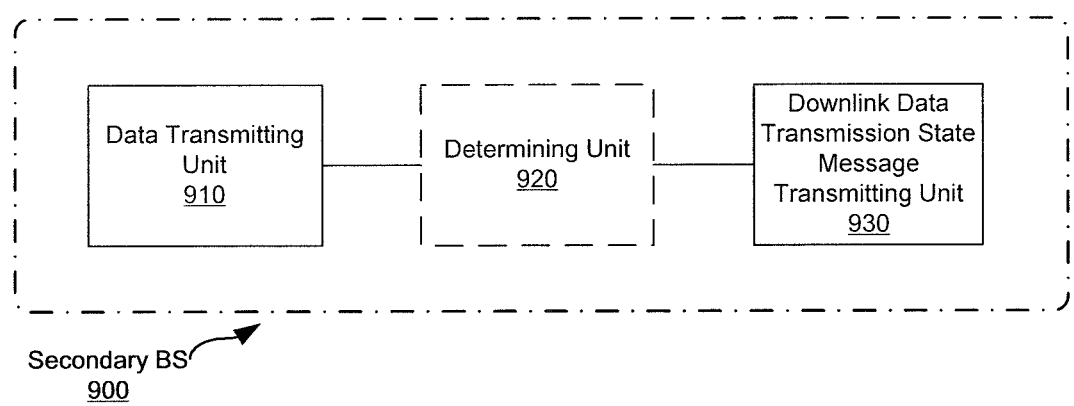
FIG. 9 is a block diagram showing an exemplary structure of a secondary BS according to the present disclosure.

Correspondingly to the above method in a secondary BS for reporting a downlink data transmission state to a master BS, a secondary BS is also provided. FIG. 9 is a block diagram showing an exemplary structure of the secondary BS 900.

As shown in FIG. 9, the secondary BS 900 according to the present disclosure includes a data transmitting unit 910 and a downlink data transmission state message transmitting unit 930. The data transmitting unit 910 is configured to transmit one or more PDCP PDUs to a UE. The downlink data transmission state message transmitting unit 930 is configured to transmit to the master BS a downlink data transmission state message including a sequence number of at least one PDCP PDU that has been transmitted successfully.

Optionally, the secondary BS 900 further includes: a determining unit 920 configured to determine whether to transmit the downlink data transmission state message to the master BS or not based on at least one of: a number of PDCP PDUs that have been transmitted successfully having reached a predetermined value; a predetermined timer having expired; and a difference between a maximum and a minimum sequence numbers among PDCP PDUs that have been transmitted successfully being larger than or equal to a predetermined bitmap length.

Figure 10:
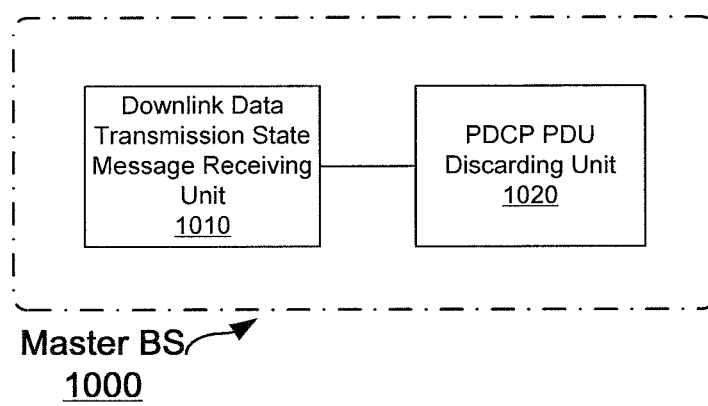
FIG. 10 is a block diagram showing an exemplary structure of a master BS according to the present disclosure.

Correspondingly to the above method in a master BS for discarding PDCP PDUs as early as possible, a master BS is also provided. FIG. 10 is a block diagram showing an exemplary structure of the master BS 1000.

As shown in FIG. 10, the master BS 1000 according to the present disclosure includes a downlink data transmission state message receiving unit 1010 and a PDCP PDU discarding unit 1020. The downlink data transmission state message receiving unit 1010 is configured to receive from a secondary BS a downlink data transmission state message including a sequence number of at least one Packet Data Convergence Protocol (PDCP) Protocol Data Unit (PDU) that has been transmitted successfully. The PDCP PDU discarding unit 1020 is configured to discard one or more PDCP PDUs stored in the master BS based on the downlink data transmission state message.

With the solutions according to the present disclosure, after PDCP PDUs have been successfully transmitted by the secondary BS, the master BS can discard the corresponding PDCP PDUs as early as possible, such that the storage space at the master BS can be saved and more SDUs can be received from the higher layer.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A communication method of a secondary Base Station (BS), comprising:
   transmitting, to a User Equipment (UE), one or more Packet Data Convergence Protocol (PDCP) Protocol Data Units (PDUs) received from a master BS;
   transmitting to the master BS a downlink data transmission state message which indicates PDCP PDUs that the secondary BS has successfully transmitted based on a number of PDCP PDUs that have been transmitted successfully by the secondary BS including at least a highest sequence number of a PDCP PDU that has been successfully transmitted to the UE among the one or more PDCP PDUs received from the master BS; and
   storing in the secondary BS, the sequence numbers of respective PDCP PDUs that have been successfully transmitted to the UE.

2. The method of claim 1, further comprising:
determining, by the secondary BS, whether to transmit the downlink data transmission state message to the master BS or not based on at least one of:
a number of PDCP PDUs that have been transmitted successfully having reached a predetermined value;
a predetermined timer having expired; and
a difference between a maximum and a minimum sequence numbers among PDCP PDUs that have been transmitted successfully being larger than or equal to a predetermined bitmap length.

3. The method of claim 2, wherein the secondary BS determines whether a second timer has expired:
if the second timer has expired, the secondary BS transmits the downlink data transmission state message to the master BS.

4. The method of claim 3, wherein, if the second timer has not expired, the secondary BS further determines whether all PDCP PDUs have been transmitted:
if all PDCP PDUs have been transmitted, the secondary BS transmits the downlink data transmission state message to the master BS;
otherwise the secondary BS does not transmit the downlink data transmission state message to the master BS.

5. The method of claim 3, wherein the downlink data transmission state message includes:
a sequence number of each PDCP PDU that has been transmitted successfully; or
a minimum sequence number among the PDCP PDUs that have been transmitted successfully, and a bitmap indicating whether each PDCP PDU subsequent to the PDCP PDU having the minimum sequence number has been successfully transmitted by the secondary BS.

6. The method of claim 3, wherein a timing period of the second timer is carried in a request message transmitted by the master BS to the secondary BS for requesting additional resources for the UE, or transmitted by the master BS to the secondary BS via an inter-node radio resource configuration message.

7. The method of claim 2, wherein the secondary BS determines whether the difference between the maximum and the minimum sequence numbers among PDCP PDUs that have been transmitted successfully is larger than or equal to the predetermined bitmap length:
if the difference is larger than or equal to the predetermined bitmap length, the secondary BS transmits the downlink data transmission state message to the master BS;
otherwise the secondary BS further determines whether a third timer has expired:
if the third timer has expired, the secondary BS transmits the downlink data transmission state message to the master BS.

8. The method of claim 7, wherein, if the third timer has not expired, the secondary BS further determines whether all PDCP PDUs have been transmitted:
if all PDCP PDUs have been transmitted, the secondary BS transmits the downlink data transmission state message to the master BS;
otherwise the secondary BS does not transmit the downlink data transmission state message to the master BS.

9. The method of claim 7, wherein the downlink data transmission state message includes:
a sequence number of each PDCP PDU that has been transmitted successfully; or
a minimum sequence number among the PDCP PDUs that have been transmitted successfully, and a bitmap indicating whether each PDCP PDU subsequent to the PDCP PDU having the minimum sequence number has been successfully transmitted by the secondary BS.

10. The method of claim 7, wherein, if the difference is larger than the predetermined bitmap length, the secondary BS further determines whether all PDCP PDUs have been transmitted:
if all PDCP PDUs have been transmitted, the secondary BS transmits the downlink data transmission state message to the master BS, the downlink data transmission state message including a sequence number of the last PDCP PDU that has been transmitted successfully;
otherwise the secondary BS does not transmit the downlink data transmission state message to the master BS.

11. The method of claim 7, wherein the bitmap length is carried in a request message transmitted by the master BS to the secondary BS for requesting additional resources for the UE, or transmitted by the master BS to the secondary BS via an inter-node radio resource configuration message.

12. The method of claim 1, wherein the secondary BS determines whether a number of PDCP PDUs that have been transmitted successfully has reached a predetermined value:
if the number of PDCP PDUs that have been transmitted successfully has reached the predetermined value, the secondary BS transmits the downlink data transmission state message to the master BS;
otherwise the secondary BS further determines whether a first timer has expired:
if the first timer has expired, the secondary BS transmits the downlink data transmission state message to the master BS.

13. The method of claim 12, wherein, if the first timer has not expired, the secondary BS further determines whether all PDCP PDUs have been transmitted:
if all PDCP PDUs have been transmitted, the secondary BS transmits the downlink data transmission state message to the master BS;
otherwise the secondary BS does not transmit the downlink data transmission state message to the master BS.

14. The method of claim 13, wherein the downlink data transmission state message includes a sequence number of each PDCP PDU that has been transmitted successfully.

15. The method of claim 12, wherein the downlink data transmission state message includes a sequence number of each PDCP PDU that has been transmitted successfully.

16. The method of claim 12, wherein the predetermined value and a timing period of the first timer are carried in a request message transmitted by the master BS to the secondary BS for requesting additional resources for the UE, or transmitted by the master BS to the secondary BS via an inter-node radio resource configuration message.

17. A secondary Base Station (BS), comprising:
data transmitting circuitry configured to and/or programmed to transmit, to a User Equipment (UE), one or more Packet Data Convergence Protocol (PDCP) Protocol Data Units (PDUs) received from a master BS;
downlink data transmission state message transmitting circuitry configured to and/or programmed to transmit to the master BS a downlink data transmission state message based on a number of PDCP PDUs that have been transmitted successfully by the secondary BS and including at least a highest sequence number of a PDCP PDU that has been successfully transmitted to the UE among the one or more PDCP PDUs received from the master BS; and a memory storing sequence numbers of respective PDCP PDUs that have been successfully transmitted to the UE.

18. The secondary BS of claim 17, further comprising:

determining circuitry configured to and/or programmed to determine whether to transmit the downlink data transmission state message to the master BS or not based on at least one of:

a number of PDCP PDUs that have been transmitted successfully having reached a predetermined value;

a predetermined timer having expired; and a difference between a maximum and a minimum sequence numbers among PDCP PDUs that have been transmitted successfully being larger than or equal to a predetermined bitmap length.

19. A communication method of a master Base Station (BS), comprising:

receiving from a secondary BS a downlink data transmission state message based on a number of PDCP PDUs that have been transmitted successfully by the secondary BS including at least a highest sequence number of a Packet Data Convergence Protocol (PDCP) Protocol Data Unit (PDU) that has been successfully transmitted to a User Equipment (UE) as stored as a sequence numbers of respective PDCP PDUs that have been successfully transmitted to the UE by the secondary BS; and removing one or more PDCP PDUs stored in the master BS based on the downlink data transmission state message which indicates PDCP PDUs that the secondary BS has successfully transmitted.

20. A master Base Station (BS), comprising:

downlink data transmission state message receiving circuitry configured to and/or programmed to receive from a secondary BS a downlink data transmission state message based on a number of PDCP PDUs that have been transmitted successfully by the secondary BS as stored as a sequence numbers of respective PDCP PDUs that have been successfully transmitted to the UE by the secondary BS and including at least a highest sequence number of a Packet Data Convergence Protocol (PDCP) Protocol Data Unit (PDU) that has been successfully transmitted to a User Equipment (UE); and PDCP PDU discarding circuitry configured to and/or programmed to remove one or more PDCP PDUs stored in the master BS based on the downlink data transmission state message.

\* \* \* \* \*